United States Patent
Rajaniemi (10) Patent No.: US 8,725,177 B2
(45) Date of Patent: May 13, 2014

(54) ACTIVATING LOCATION BASED SERVICE APPLICATIONS

(75) Inventor: Jaakko Matti Rajaniemi, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 125 days.

(21) Appl. No.: 13/377,072

(22) PCT Filed: Jun. 12, 2009

(86) PCT No.: PCT/EP2009/057282
§ 371 (c)(1), (2), (4) Date: Jan. 31, 2012

(87) PCT Pub. No.: WO2010/142345
PCT Pub. Date: Dec. 16, 2010

(65) Prior Publication Data
US 2012/0122482 A1    May 17, 2012

(51) Int. Cl.
*H04W 24/00*    (2009.01)

(52) U.S. Cl.
USPC ..................... 455/456.3; 455/456.1

(58) Field of Classification Search
CPC ....... H04L 67/08; H04L 67/40; H04W 4/001; H04W 4/021
USPC ........................................... 455/456.1, 456.3
See application file for complete search history.

(56) References Cited

U.S. PATENT DOCUMENTS

| | | | |
|---|---|---|---|
| 2006/0143098 A1* | 6/2006 | Lazaridis | 705/34 |
| 2009/0005052 A1 | 1/2009 | Abusch-Magder et al. | |
| 2010/0172274 A1* | 7/2010 | Wu et al. | 370/311 |

FOREIGN PATENT DOCUMENTS

WO    WO 2005/117295 A1    12/2005

OTHER PUBLICATIONS

International Search Report corresponding to International Application No. PCT/EP2009/057282 dated Sep. 4, 2009.

* cited by examiner

*Primary Examiner* — Opiribo Georgewill
(74) *Attorney, Agent, or Firm* — Squire Sanders (US) LLP (57) ABSTRACT

The present invention relates to providing methods and apparatus for identifying a location area of a mobile device, determining whether an LBS application should be activated on the mobile device based on the location area and activating the LBS application on the mobile device. A Mobile Network Operator server may identify the location area of a mobile device and activate an application on the mobile device while a third party LBS application provider server may make the determination as to whether an LBS application should be activated on the mobile device.

4 Claims, 4 Drawing Sheets

ACTIVATING LOCATION BASED SERVICE APPLICATIONS

BACKGROUND

1. Field

The present invention relates to Location Based Services (LBS) and in particular to the activation of LBS applications on mobile communication devices.

2. Description of the Related Art

Location Based Services (LBS) are typically used by mobile device users in order to access and receive information via the user's mobile device based on the geographical location of the mobile device. Currently, LBSs offer a vast range of services for the mobile device user based on the mobile devices geographical location such as identifying the mobile device location on a map, identifying the nearest item of interest to the mobile device user such as the nearest Automated Teller Machine (ATM), informing the mobile device user of the local surrounding area, targeting adverts to the mobile device from local businesses and so on. The number of possible and uses of LBSs are vast and covers many topics from information services to entertainment services including even location based games.

Accordingly, an essential aspect of LBSs is to determine the geographical location of the mobile device using the LBSs. Currently, there are two main methods of determining the geographical location of a mobile device. The first method is to determine the location of the mobile device by identifying the cell that the mobile device is in communication with and the second method is to determine the location of the mobile device using the Global Positioning System (GPS).

Considering the first method mentioned above, a typical mobile network comprises many cells where each cell comprises at least one Base Transceiver Station (BTS) which provide network coverage for the cell. Thus, by identifying the cell in which the mobile device currently resides an approximate geographical location of the mobile device can be determined. However, this method only provides an approximate geographical location of the mobile device because only the cell can be identified and not whereabouts in the cell the mobile device is actually located. In an urban environment the accuracy of this method of identifying the cell in which the mobile device currently resides can be as good as a few hundred meters radius from the position of the BTS serving the cell in urban areas, but as poor as 40 km radius from the position of the BTS serving the cell in rural areas. Accordingly, the accuracy in terms of being able to determine a geographical area in which the mobile device resides depends on the known range of the particular BTS serving the mobile device.

Thus, this method of identifying the cell has the problem that it will only identify a geographical area surrounding the BTS serving the cell that the mobile device is currently in communication with. However, most LBSs require a more accurate determination of the geographical location of the mobile device in order to provide the information and data that the user of the mobile device requires.

The second method of determining the location of a mobile device is by using the Global Positioning System (GPS) which is a well-known and standard technology. Nowadays, most mobile devices are equipped with GPS receivers which enable the mobile device to determine its location to a high degree of accuracy and often to within a few meters. However, the problem with using GPS based location determination on mobile devices is that it is very battery intensive and therefore will run down the mobile device battery if used constantly to track and determine the location of the mobile device.

LBSs are typically applications often developed and provided by third parties. The applications are installed on the user's mobile device to provide the information and services based on the determined location of the mobile device. Most LBS applications require an accurate determination of the location of the mobile device in order to provide relevant information and services to the user of the mobile device regarding points of interest in the vicinity of the mobile device.

The third party LBS application needs to be running on the mobile device which is tracking its own location in order to provide the user of the mobile device information regarding a point of interest that the mobile device is in the vicinity of. However, the user of the mobile device may not have activated the third party LBS application or the user may not have activated GPS on their mobile device due to battery considerations.

Accordingly, there is a need for a more efficient manner in utilising the LBS applications whilst taking into consideration the network resource usage and the mobile device resource usage requirements.

SUMMARY

According to a first aspect there is provided a method comprising: identifying a location area of a mobile device; transmitting the identified location area of the mobile device to a server; receiving a request from the server to activate an application on the mobile device; and transmitting a message to the mobile device in order to activate the application on the mobile device in response to the request.

The method enables the location area of a mobile device to be identified and transmitted to a server. A request can then be received from the server that requests the application be activated on the mobile device which is enabled by transmitting a message to the mobile device.

The request may include data that identifies the application that is to be activated and the mobile device on which the application should be activated. The message that may be generated in response to the request may be transmitted using Short Message Service (SMS), Wireless Application Protocol (WAP) or any other protocol that allows the Mobile Network Operator (MNO) to communicate with the mobile device. The message transmitted to the mobile device may include instructions, for example in the form of activation codes, which instruct the mobile device to activate the identified application on that mobile device. The mobile device may recognise that the message is a control message and accordingly interpret the commands contained therein in order to activate the LBS application.

The step of identifying the location area of the mobile device may comprise: identifying a Base Transceiver Station serving a cell wherein the mobile device is in communication with the Base Transceiver Station; and determining a coverage area of the cell wherein the coverage area identifies the location area of the mobile device.

The location area of a mobile device may be determined by identifying the Base Station Transceiver (BTS) that the mobile device is in communication with. Typically, one BTS will serve a particular cell and therefore by identifying the BTS the method may identify the cell within which the mobile device currently resides. The coverage area of the cell may then be used to determine the geographical location area in which the mobile device is located. Alternatively, the cell in which the mobile device currently resides, the coverage area of which may define the geographical location area, may be identified directly from communications transmitted to the network from the mobile device where the communication identifies the cell the mobile device is in communication with via a Cell ID parameter included in the communications.

The step of identifying the location area of the mobile device may further comprise: determining whether a signal strength of at least one further Base Station Transceiver serving at least one further cell as measured by the mobile device is above a predetermined threshold; and if the signal strength of at least one further Base Station Transceiver is above a predetermined threshold then the coverage area further includes the coverage area of the at least one further cell.

In a modern mobile telecommunication network cells are often planned and provisioned in an overlapping architecture especially, for example, in urban and densely populated areas. It is also often the case that macro cells, which are cells contained within other cells to provide extra capacity in high usage areas, are also implemented in mobile telecommunication network architectures. Therefore, a mobile device may be in an area of overlap between two or more cells or be in a macro cell that is contained within another cell. In a typical mobile network the mobile device will take measurements of the reception level (e.g. signal strength) of adjacent neighbouring cells which is used for several functions in a conventional mobile telecommunication networks including, for example, to determine whether a hand over of the mobile device should occur between cells. However, the method of the present invention may also use this information to determine a wider location area of the mobile device. For example, if the signal strength of a neighbouring cell is above a predetermined threshold then the mobile device will be near to a further cell or in an area of overlap between adjacent cells or between macro cells and normal cells. Therefore, the location area may be determined to include the coverage area of further cells that the mobile device may be within the boundaries of those further cells.

The coverage area of a cell may be defined by a signal range of a Base Station Transceiver serving the cell. The method, by knowing the signal range of a BTS, may then determine the geographical location area that the mobile device currently resides.

The application that may be activated on a mobile device may be a Location Based Service application.

According to a second aspect of the present invention there is provided a server operatively connected to a mobile network that is adapted to: identify a location area of a mobile device; transmit the identified location area of the mobile device to a second server; receive a request from the second server to activate an application on the mobile device; and transmit a message to the mobile device in order to activate the application on the mobile device in response to the request.

The server may be a Mobile Network Operator (MNO) server which identifies the location area of a mobile device and transmits this location area to a second server. The second server may be a server belonging to a third party who has developed the application which may be a Location Based Service (LBS) application. The server can then receive a request from the second server for the application to be activated on the mobile device which is performed by the server transmitting a message to the mobile device.

The server may be further adapted to: identify a Base Transceiver Station serving a cell wherein the mobile device is in communication with the Base Transceiver Station; and determine a coverage area of the cell wherein the coverage area identifies the location area of the mobile device. Alternatively, the cell in which the mobile device currently resides the coverage area of which defines the geographical location area may be identified directly from communications transmitted to the network from the mobile device where the communication identifies the cell via a Cell ID parameter.

The server may be further adapted to: determine whether a signal strength of at least one further Base Station Transceiver serving at least one further cell as measured by the mobile device is above a predetermined threshold; and if the signal strength of at least one further Base Station Transceiver is above a predetermined threshold then the coverage area further includes the coverage area of the at least one further cell.

The coverage area of a cell may be defined as a signal range of a Base Station Transceiver serving the cell.

As a person skilled in the art will appreciate, a server may be adapted to perform the functions by installing the appropriate and corresponding computer readable executable code on the server.

According to a third aspect of the present invention there is provided a computer program product comprising computer readable executable code configured to: identify a location area of a mobile device; transmit the identified location area of the mobile device to a server; receive a request from the server to activate an application on the mobile device; and transmit a message to the mobile device in order to activate the application on the mobile device in response to the request.

The computer program product may comprise computer readable executable code for performing any or all of the functions in accordance with the aspects of the invention.

According to a fourth aspect of the present invention there is provided a method comprising: receiving a location area of a mobile device; determining if the location area of the mobile device meets a predetermined criteria for at least one application; and transmitting a request to a server to activate the application on the mobile device if the location area meets the predetermined criteria.

In this method the received location area of a mobile device is compared with predetermined criteria for at least one application and if the predetermined criteria is met then a request is sent to a server to activate the application on the mobile device. Thus, the present invention advantageously enables an application to be requested to be activated on a mobile device based on whether the location area of the mobile device meets a predetermined criteria for the application. The location area may be defined by a geographical area of a cell or combination of cells.

The step of determining if the location area of the mobile device meets the predetermined criteria may comprise: determining if the location area of the mobile device is in the vicinity of a point of interest wherein the point of interest is relevant to the application.

Thus, depending on the location area of the mobile device it may be determined for an application, which may be a Location Based Service (LBS) application, whether the mobile device is near to a point of interest that is relevant to the application. If the mobile device is in the vicinity of the point of interest to the application then a request can be sent to a server requesting that the application is activated on the mobile device.

The request transmitted to the server may include an identification of the mobile device and an identification of the application to be activated on the mobile device.

According to a fifth aspect of the present invention there is provided a server adapted to: receive a location area of a mobile device; determine if the location area of the mobile device meets a predetermined criteria for at least one application; and transmit a request to a second server to activate the application on the mobile device if the location area meets the predetermined criteria.

The server may be a third party server belonging to the third party developer of the application. The server receives a location area of the mobile device and determines whether the location area meets a predetermined criteria in order to determine whether the application should be activated on the mobile device. If so, then a request is transmitted to a second server, which may be a Mobile Network Operator server, to request that the application is activated on the mobile device.

To determine if the location area of the mobile device meets a predetermined criteria the server may be further adapted to: determine if the location area of the mobile device is in the vicinity of a point of interest wherein the point of interest is relevant to the application.

Thus, the predetermined criteria may be any predetermined criteria that is relevant to individual applications. Therefore, the predetermined criteria may be different for each application. For example, the predetermined criteria may be the locality of the mobile device as defined by the location area of the mobile device to a point of interest that is relevant to the application.

As a person skilled in the art will appreciate, a server may be adapted to perform the functions by installing the appropriate and corresponding computer readable executable code on the server.

According to a sixth aspect of the present invention there is provided a computer program product comprising computer program executable code configured to: receive a location area of a mobile device; determine if the location area of the mobile device meets a predetermined criteria for at least one application; and transmit a request to a second server to activate the application on the mobile device if the location area meets the predetermined criteria.

The computer program product may comprise computer readable executable code for performing any or all of the functions in accordance with the aspects of the invention.

BRIEF DESCRIPTION OF THE DRAWINGS

Preferred embodiments of the present invention will now be described, by way of example only, and with reference to the accompanying drawings, in which.

DETAILED DESCRIPTION

Figure 1:
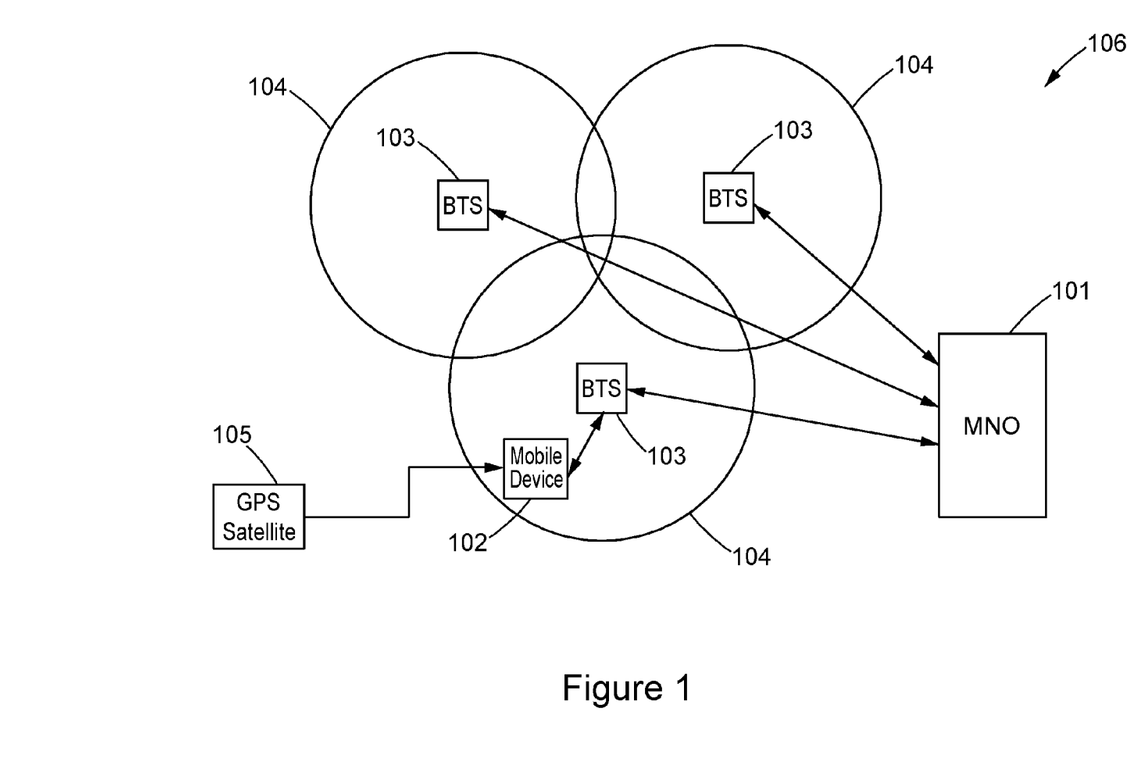
FIG. 1 shows a schematic drawing of a typical mobile network in accordance with the aspects of the invention.

As shown in FIG. 1, a mobile device 102 typically communicates with a Base Transceiver Station (BTS) 103 that serves a cell 104 in which the mobile device currently resides. In urban areas multiple cells 104 are used in an overlapping arrangement in order to provide adequate mobile network coverage to the mobile device users. The number of BTSs 103 and cells 104 will vary depending on the area e.g. urban, rural etc and the mobile network 106 design. The Mobile Network Operator (MNO) 101 typically comprises several servers and management systems in order to manage and control the mobile network 106. The mobile device 102 may also receive signals from GPS satellites 105 which enables the mobile device 102 to determine its geographical location to a high degree of accuracy.

An MNO may offer LBSs to the mobile device user but more typically, a third party usually develops and provides Location Based Services (LBS) via third party LBS applications for the mobile device user. The mobile device user may download and install the third party LBS application for a particular LBS on their mobile device 102 which, when activated, will provide the user with information and services relevant to the purpose of the LBS application based on the geographical location of the mobile device 102. As mentioned hereinabove, the third party LBS applications may cover a vast range of subjects from commercial, e.g. providing the user with adverts relevant to points of interest in the vicinity of the mobile device for example, hotel adverts, sport centre adverts, current price deals in nearby shops and so on, informative, e.g. providing the user with information regarding points of interest located in the vicinity of the mobile device 102 depending on the requirements of the user such as local restaurants, local ATMs and so on, or entertainment, such as location based games.

In order for LBS applications to adequately provide the relevant information to the user the application needs to be running on the mobile device and the location of the mobile device 102 needs to be determined. However, as discussed above there are several problems associated with this which include the fact that the user may not have activated the relevant LBS application and/or the user may not have activated GPS on their mobile device 102.

Accordingly, in the embodiments of the present invention the MNO may provide two services to the third party LBS application provider.

Firstly, the MNO may track the approximate location of the mobile device 102 by determining the cell (or cells) 104 within which the mobile device 102 currently resides and provides this information to the third party LBS application provider.

The second service the MNO may provide to the third party LBS application provider is to activate the third party LBS application on the mobile device 102 on request of the third party LBS application provider. The third party LBS application provider may request that the third party LBS application is activated if the third party LBS application provider determines that the approximate location area of the mobile device 102 is near to or overlaps with a point of interest for a particular LBS application installed on the mobile device 102. Also, if the third party LBS application requires a more accurate determination of the geographical location of the mobile device 102 then by activating the third party LBS application it may in turn activate the GPS receiver of the mobile device 102 in order to determine the geographical location of the mobile device 102 to a higher degree of accuracy. By only activating GPS on the mobile device 102 when it is required conserves and makes more efficient use of the battery in the mobile device 102.

The conditions of use of the third party LBS application by the user of the mobile device may include a condition that they agree to allow the MNO to activate the third party LBS application on their mobile device 102 and allow the MNO to provide the approximate location of the mobile device to the third party LBS application provider.

Figure 2:
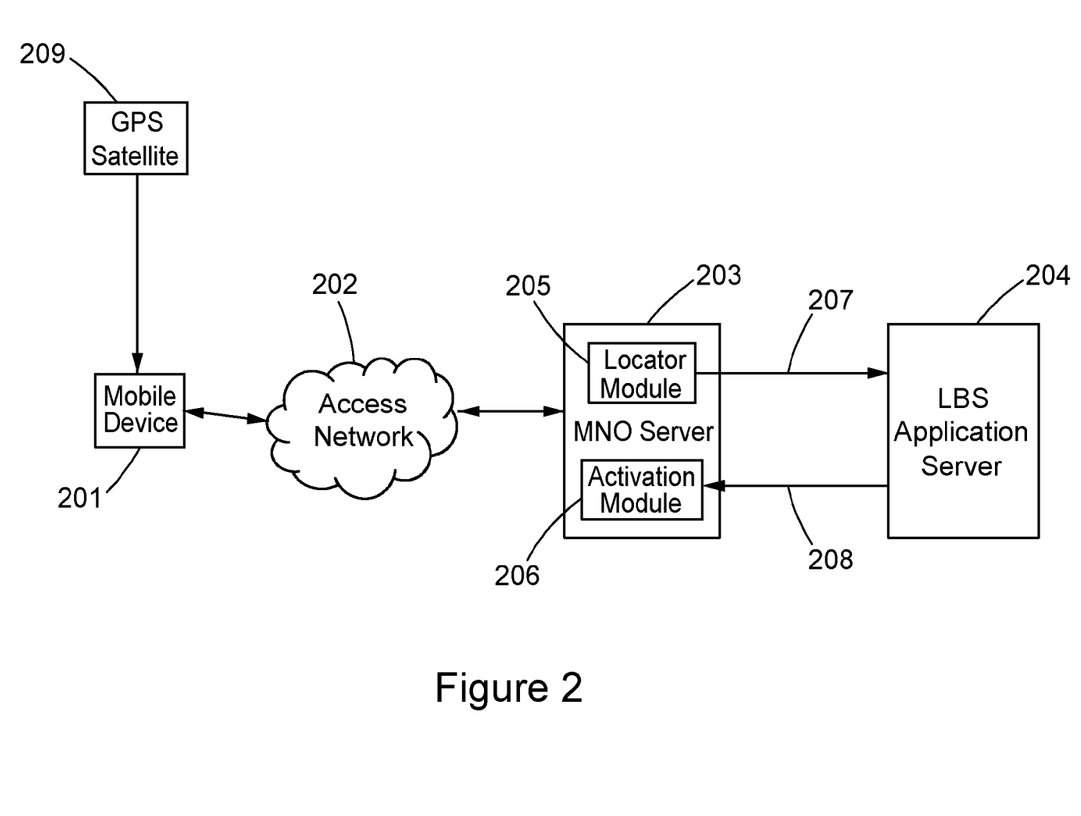
FIG. 2 shows a system in accordance with the aspects of the invention.

With reference to FIG. 2, in the embodiments of the present invention the MNO tracks the location of the mobile device 201 via a locator module 205 on the MNO servers 203. The approximate location of the mobile device 201 may be determined by identifying the cell or cells in which the mobile device 201 currently resides. The mobile device 201 and the MNO servers 203 typically communicate over an access network 202 that typically comprises multiple BTSs serving particular cells that cover a particular geographical area. In conventional networks the mobile device 201 will inform the network, typically every 0.5 seconds, certain measurement data including the Cell ID of the cell the mobile device 201 is communicating with along with the reception levels (e.g. the signal strength) of up to six neighbouring cells. Thus, the locator module can make use of this information or other communications from the mobile device 201 that include the Cell ID to determine the cell the mobile device currently resides in and therefore the approximate geographical location area of the mobile device 201.

The location area of a mobile device 201 may also be determined by identifying the Base Station Transceiver (BTS) that the mobile device is in communication with. Typically, one BTS will serve a particular cell and therefore by identifying the BTS the method may identify the cell within which the mobile device 201 currently resides.

This method of location tracking of the mobile device is such that it minimises the required network resources and the required mobile device resources including the battery of the mobile device 201.

The MNO servers 203 transmit 207 the approximate location area of the mobile device 201 to the third party LBS application provider's servers 204 either in a push or a pull manner. In other words the MNO servers 203 may transmit 207 the approximate location of the mobile device 201 to the third party LBS application provider's servers 204 every time the approximate location of the mobile device 201 changes, i.e. push the information to the third party LBS application provider servers 204, or the MNO servers 203 may transmit 207 the approximate location of the mobile device 201 to the third party LBS application provider's servers 204 once requested to do so by the third party LBS application provider servers 204, i.e. the third party LBS application provider pulls the information from the MNO.

The MNO servers 203 may store a list of mobile devices 201 that have downloaded and installed a third party LBS application and therefore are the mobile devices 201 that the third party LBS application provider is interested in knowing the approximate location area of. At the time that a user downloads and installs a third party LBS application on their mobile device 201 the third party LBS application provider server 204 will inform the MNO servers 203 that they wish to receive updates as to the approximate location of that mobile device 201. Alternatively, the third party LBS application when installed on the mobile device 201 may, as part of the installation process, inform the MNO for the mobile device 201 that the application has been installed and as such the mobile device user has given their permission to the MNO to inform the third party LBS application provider of the approximate location of the mobile device 201.

The third party LBS application provider servers 204 on receipt of the approximate location of a mobile device 201 will then determine whether predetermined criteria are met in order to request the activation of the relevant third party LBS application on the mobile device 201. The criteria that should be met in order to request activation of a particular third party LBS application may depend on the type of application and on the current approximate location of the mobile device 201.

For example, if the third party LBS application relates to providing information to the user of the mobile device 201 regarding certain points of interest, e.g. attractions to visit, then the predetermined criteria for activating the third party LBS application may be that the approximate location of the mobile device 201 overlaps with a point of interest.

Figure 3:
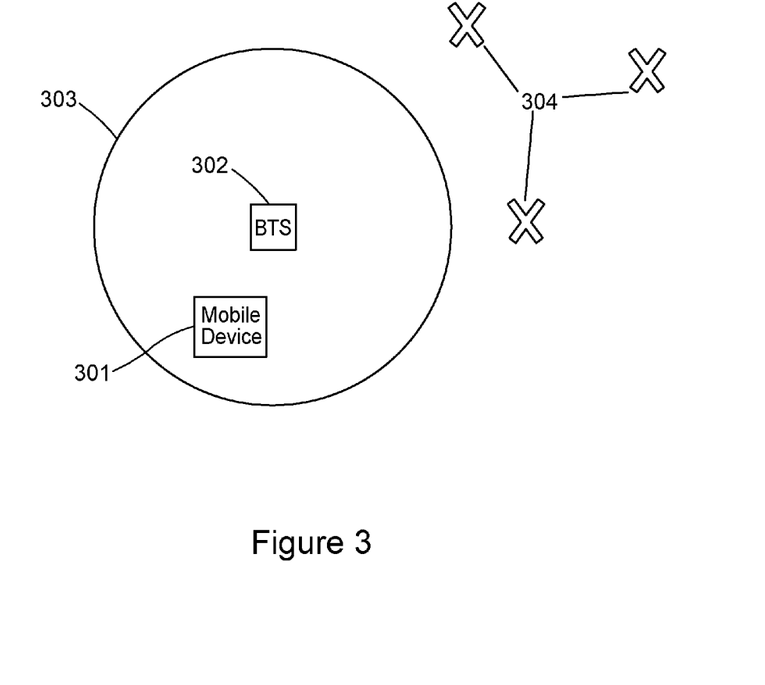
FIG. 3 is a block diagram showing features in accordance with the aspects of the invention.

With reference to FIG. 3, the third party LBS application provider server's will determine whether the approximate location of the mobile device 301, which in this example relates to the area of the cell 303 defined by the range of the BTS 302 serving the cell that the mobile device 301 is currently in communication with, overlaps with a point of interest 304. As shown in FIG. 3, the approximate location of the mobile device 301 as defined by the cell 303 does not overlap with any point of interest 304 and accordingly the predetermined criteria for activating the third party LBS application is not met.

Figure 4:
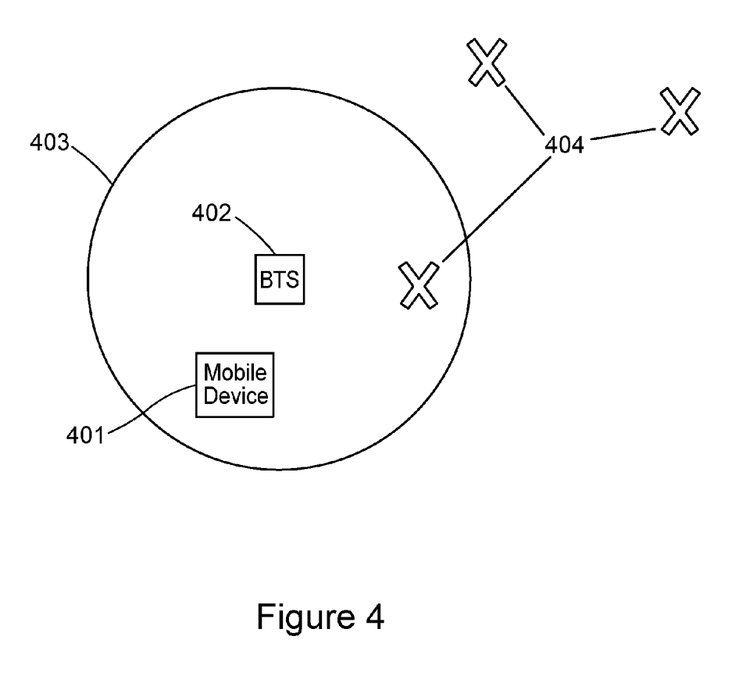
FIG. 4 is a block diagram showing features in accordance with the aspects of the invention.

However, as shown in FIG. 4, if the approximate location of the mobile device 401, which again in this example relates to the area of the cell 403 defined by the range of the BTS 402 that the mobile device 401 is currently in communication with, overlaps with at least one point of interest 404 then it is determined that the mobile device 401 may be near to a point of interest 404 to an LBS application and therefore the predetermined criteria for requesting that the third party LBS application is activated has been met.

As described hereinabove, in a conventional telecommunication network a mobile device transmits, typically every 0.5 seconds, measurement data which includes the Cell ID of the cell it is in communication with along with the reception level (e.g. signal strength) of up to six neighbouring cells. The measurement data may be used by the network for several reasons, for example, to determine whether the current BTS of the cell that the mobile device is in communication with should handover the mobile device to a BTS of a neighbouring cell.

As neighbouring cells typically overlap then the MNO servers may determine the approximate location area of the mobile device in terms of the area defined by a number of neighbouring cells based on the reception level received relating to the neighbouring cells. Thus, the MNO servers locator module may identify the approximate location area of the mobile device in relation to the area of the cell the mobile device is currently in communication with along with the area of neighbouring cells that have a reception level (e.g. signal strength) over a predetermined threshold which may represent that the mobile device is in an area of overlap between neighbouring cells. The locator module on the MNO servers may then provide the third party LBS application the approximate location area of the mobile device in terms of a group of cells. The third party LBS application providers can then determine whether the approximate location defined by area of several cells meets a predetermined criteria for activating the third party LBS application on the mobile device.

Returning to FIG. 2, once it is determined by the third party LBS application provider servers 204 that the third party LBS application should be activated on the mobile device 201, as the predetermined criteria for the application has been met, then the third party LBS application servers 204 will transmit 208 a message to the MNO servers 203 requesting that the MNO servers 203 activate the third party LBS application on the mobile device 201. The message transmitted to the MNO servers 203 from the third party LBS application provider servers 204 identifies at least the third party LBS application to be activated and the mobile device 201 on which the third party LBS application is to be activated.

On receipt of the message from the third party LBS application provider servers 203 an activation module 206 on the MNO servers 203 processes the received message to determine the mobile device 201 and the specific third party LBS application to be activated on the mobile device 201. The activation module 206 communicates with the mobile device 201 via the access network 202 in order to activate the third party LBS application on the mobile device 201. An activation message may be transmitted to the mobile device 201 from the activation module 206 on the MNO servers 203 via, for example, Wireless Application Protocol (WAP) push or Short Message Service (SMS).

The process of transmitting a control message to a mobile device 201 via SMS or WAP is known in the art and would be understood by a skilled person. The generation and transmission of the activation message to the mobile device 201 by the activation module 206 is substantially similar to the process of transmitting a known control message to a mobile device 201. For example, if the activation message is transmitted to a mobile device 201 by SMS then the SMS message may contain an indication that it is a control message and accordingly is a message to be interpreted by the mobile device 201 rather than provided to the mobile device user. The body text of the SMS will include commands and instructions which are interpreted by the mobile device 201 and cause the mobile device 201 to perform various control functions. For example, the body text of the SMS may include the command "ACTIVATE" followed by "APPLICATION_NAME". Thus, the mobile device 201 will interpret this SMS message received from the activation module 206 on the MNO server 203 and perform the function of activating the LBS application defined by the parameter "APPLICATION_NAME".

The third party LBS application, once activated on the mobile device 201, may also activate and utilise the GPS receiver of the mobile device 201 to determine a more accurate geographical location of the mobile device 201 using GPS satellite 209 if a more accurate determination of the geographical location is required by the third party LBS application. Thus, the GPS functionality of the mobile device is only activated and used when required which reduces the battery consumption and increases battery life of the mobile device 201.

Accordingly, the preferred embodiments enable a more efficient and effective use of third party LBS applications whilst taking into consideration and making efficient use of both the network resources and mobile device resources. The embodiments advantageously allow the third party LBS application provider to monitor the approximate location of a mobile device that has installed at least one of the third party LBS applications. Based on the type of LBS application and the approximate location of the mobile device provided by the MNO the third party LBS application provider can determine whether the application should be activated on the user's mobile device.

If the third party LBS application provider determines, based on the approximate location of the mobile device, that the application installed on the mobile device may be able to deliver useful or required information to the user then the third party LBS application provider will request that the MNO activates the LBS application on the mobile device. If a more accurate determination of the geographical location of the mobile device is required by the LBS application then by activating the application the GPS receiver in the mobile device can also be activated.

Thus, the user of the mobile device can receive the LBS they require via the third party LBS application without needing to have the LBS application or the GPS receiver in their mobile device permanently active which advantageously conserves the battery power of the mobile device.

While preferred embodiments of the present invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and scope of the invention.

The invention claimed is:

1. A method comprising:
   identifying a location area of a mobile device;
   transmitting said identified location area of said mobile device to a server;
   receiving a request from said server to activate an application on said mobile device; and
   transmitting a message to said mobile device in order to activate said application on said mobile device in response to said request,
   wherein said identifying of said location area of said mobile device comprises
      identifying a Base Transceiver Station serving a cell wherein said mobile device is in communication with said Base Transceiver Station;
      determining a coverage area of said cell wherein said coverage area identifies said location area of said mobile device;
      determining whether a signal strength of at least one further Base Transceiver Station serving at least one further cell as measured by said mobile device is above a predetermined threshold; and
      if the signal strength of at least one further Base Transceiver Station is above a predetermined threshold, then the coverage area further includes the coverage area of the at least one further cell.

2. The method as claimed in claim 1, in which said coverage area of a cell is defined by a signal range of the Base Transceiver Station serving said cell, and the identifying comprises identifying the location area based on the signal range of the Base Transceiver Station.

3. A server operatively connected to a mobile network, the server configured to:
   identify a location area of a mobile device;
   transmit said identified location area of said mobile device to a second server;
   receive a request from said second server to activate an application on said mobile device;
   transmit a message to said mobile device in order to activate said application on said mobile device in response to said request;
   identify a Base Transceiver Station serving a cell wherein said mobile device is in communication with said Base Transceiver Station;
   determine a coverage area of said cell wherein said coverage area identifies said location area of said mobile device;
   determine whether a signal strength of at least one further Base Station Transceiver serving at least one further cell as measured by said mobile device is above a predetermined threshold; and
   if the signal strength of at least one further Base Station Transceiver is above a predetermined threshold, then the coverage area further includes the coverage area of the at least one further cell.

4. A computer program, embodied on a non-transitory computer readable medium, the computer program configured to control a processor to:
   identify a location area of a mobile device;
   transmit said identified location area of said mobile device to a server;

receive a request from said server to activate an application on said mobile device; and transmit a message to said mobile device in order to activate said application on said mobile device in response to said request, wherein said identifying of said location area of said mobile device comprises identifying a Base Transceiver Station serving a cell wherein said mobile device is in communication with said Base Transceiver Station;

determining a coverage area of said cell wherein said coverage area identifies said location area of said mobile device;

determining whether a signal strength of at least one further Base Transceiver Station serving at least one further cell as measured by said mobile device is above a predetermined threshold; and if the signal strength of at least one further Base Transceiver Station is above a predetermined threshold, then the coverage area further includes the coverage area of the at least one further cell.

* * * * *